United States Patent [19]

Campa

[11] Patent Number: 4,510,661
[45] Date of Patent: Apr. 16, 1985

[54] APPARATUS FOR DISASSEMBLING A UNIVERSAL JOINT

[76] Inventor: Eddie L. Campa, 122 Shirley Ct., Colton, Calif. 92324

[21] Appl. No.: 520,892

[22] Filed: Aug. 8, 1983

[51] Int. Cl.³ .............................................. B23P 19/04
[52] U.S. Cl. ...................................................... 29/259
[58] Field of Search ....................... 269/258, 287, 251; 29/258-260, 227; 254/10.5

[56] References Cited

U.S. PATENT DOCUMENTS

| 692,381 | 2/1902 | Swaffield | 269/258 |
| 2,762,079 | 9/1956 | Morse | 269/251 |
| 4,120,082 | 10/1978 | Bond | 29/256 |

Primary Examiner—Robert C. Watson
Attorney, Agent, or Firm—Harvey S. Hertz

[57] ABSTRACT

Apparatus for disassembling a universal joint includes a generally U-shaped member formed of a base and a pair of arms. A drive bar is movable with respect to the arms. The drive bar is moved by rotating a bolt positioned in the base and moves generally parallel to axis of the arms.

2 Claims, 3 Drawing Figures

APPARATUS FOR DISASSEMBLING A UNIVERSAL JOINT

BACKGROUND OF THE INVENTION (1) Field of the Invention

The field of art to which the invention pertains includes the field of universal joint disassembly tools, and more particularly, to a tool for disassembling a universal joint having a bearing assembly whose flanges are integrally formed with a bearing cup.

(2) Description of the Prior Art

Numerous tools have been manufacturer for assembling and disassembling universal joints. However, for those applications where the bearing assembly of the universal joint includes a bearing cup having an integrally formed mounting flange, it has been necessary to utilize a force, such as a hammer to disengage the bearing assembly from the universal joint. Once the bearing assemblies were removed, the yoke connected to a shaft could be removed from the journal assembly of the universal joint. However, the normal tools which have been designated for simpler universal joints such as that used in automobiles were not usable in heavy duty universal joints such as that found in trucks.

Known prior art includes U.S. Pat. Nos. 3,076,259; 1,498,933; 4,343,075; 4,120,182; 3,786,554; and 3,230,617.

The present invention provides a novel tool for disassembling a universal joint by removing the bearing assemblies whose end flanges are integrally formed with the bearing cup. The invention can also be utilized when the shafts interconnected by the universal joint are at an angle with respect to each other.

The manner in which the invention addresses the disadvantages of the prior art to provide a novel and highly advantageous universal joint disassembly tool will be understood as this discription proceeds.

SUMMARY OF THE INVENTION

Apparatus for disassembling a universal joint includes a generally U-shaped member formed of a base and a pair of arms. A drive bar is moveable with respect to the arms. The drive bar is moved by means of bolt positioned in the base and moves generally parallel to the axis of the arms.

The advantages of the invention, both as to its construction and mode of operation, will be readily appreciated as the same becomes better understood by reference to the following detailed description when considered in connection with the accompanying drawings, in which like, referenced numerals designate like parts throughout the figures.

DETAILED DESCRIPTION

Figure 1:
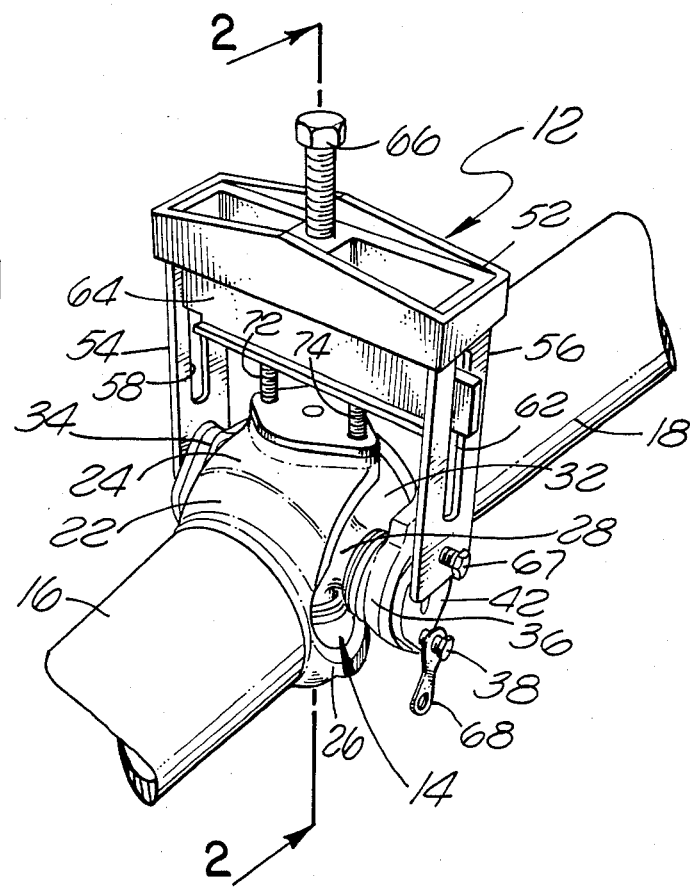
FIG. 1 is a perspective drawing of the tool of the present invention shown mounted on a univeral joint.

Referring now to the drawings, there is shown in FIG. 1 a universal joint disassembly tool 12 constructed in accordance with principals of the invention. The tool 12 is shown mounted on a univeral joint 14 which is used to interconnect a first drive shaft 16 to a second drive shaft 18.

The first drive shaft 16 terminates at a yoke 22 having a pair of horizontally configured arms 24 and 26 which are positioned adjacent opposite ends of a journal assembly 28 of the universal joint 14. Similarly, the shaft 18 terminates at a yoke 32 whose vertical arms 34 and 36 are connected across the ends of the journal assembly 28. Each of the horizontal arms 24, 26 and the vertical 34, 36 are secured to journal assembly 28 by means of a pair of cap screws 38 which pass through a flange 42 of a bearing assembly 44 (shown in greater detail in FIG. 2).

The present invention relates to the tool 12 which enables the bearings assemblies to be removed from each of the horizontal arms 24, 26 and the vertical arms 34, 36. Once the bearing assemblies have been removed from the arms of either the yoke 22 or the yoke 32 the yoke and its shaft can be removed from the universal joint. In addition, should all four bearing assemblies be removed from each of the horizontal arms 24 and 26 as well as the vertical arms 34 and 36 the journal assembly 28 can be removed from the universal joint.

The tool 12 is a generally U-shaped configuration and comprises a base 52 which interconnects a pair of generally parallel arms 54 and 56. The arms 54 and 56 contain slots 58 and 62 respectively enabling a drive bar 64 to be moveable therein. A drive bolt 66 extends through the base 52 and is used to force the drive bar 64 toward the bearing assembly flange 42 as will explained in greater detail hereinafter.

In FIG. 1 it is assumed that the drive shaft 16 and its yoke 22 are to be removed from the universal joint 14. In such an operation, the free end of the tool arms 54 and 56 are placed adjacent to the outer surface of the yoke vertical arms 34 and 36, respectively. One of the cap screws 38 securing the bearing assembly flange to the yoke arm is removed as shown in FIG. 1 and a securing bolt 67 is used to secure the tool arm 56 to the yoke arm 36. As can be seen in FIG. 1, a lock plate 68 will then be left suspended only to the lower cap screw 38 attached to the bearing assembly flange adjacent to yolk arm 36. Similarly, the tool arm 54 is secured to the yoke vertical arm 34 as can be seen in FIG. 2.

Both of the cap screws 38 are removed from the bearing assembly flange 44 securing the yoke horizontal arm 24 to the journal assembly 28. Then drive studs 72 and 74 are inserted in the openings in which the cap screws 38 were previously secured. The drive studs 72 and 74 extend above the top surface of the bearing assembly flange 44.

Figure 2:
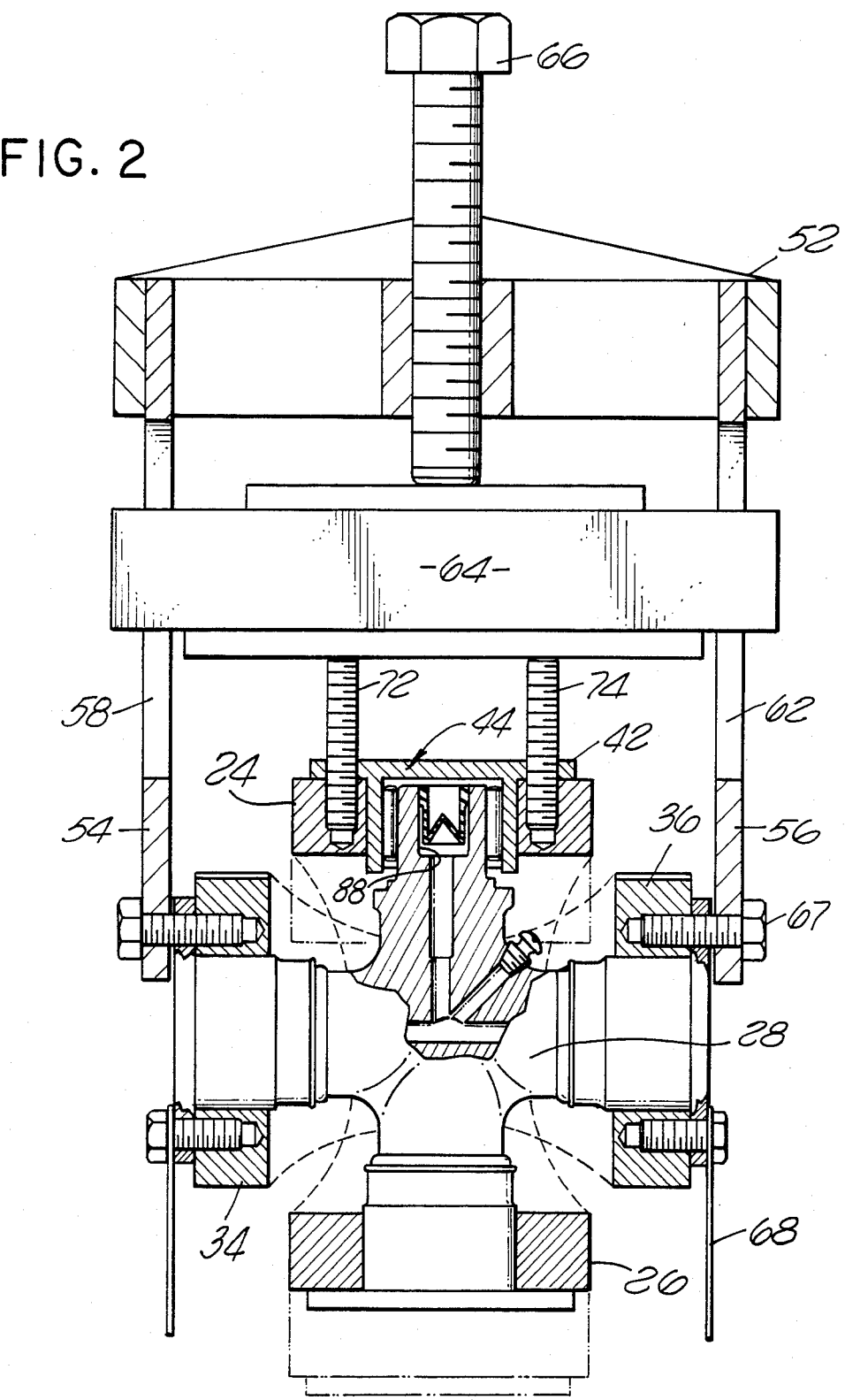
FIG. 2 is a cross-sectional view of the tool and universal joint taken along the line 2—2 of FIG. 1.

Referring now to FIG. 2, movement of the drive bolt 66 in a vertical direction causes the bottom surface of the drive bar 64 to abut the drive studs 72 and 74. The drive studs in turn force the yoke 22 to move downwardly as shown by the dotted lines in FIG. 2, thus exposing the bearing assembly associated with yoke horizontal arm 24. This bearing assembly can now easily be removed. The tool 12 is then removed and similarly placed so that the drive studs 72 and 74 pass through the cap screw openings of the bearing assembly associated with the horizontal arm 26. Once this bearing assembly is removed the yoke 22 can be removed from the universal joint 14.

Figure 3:
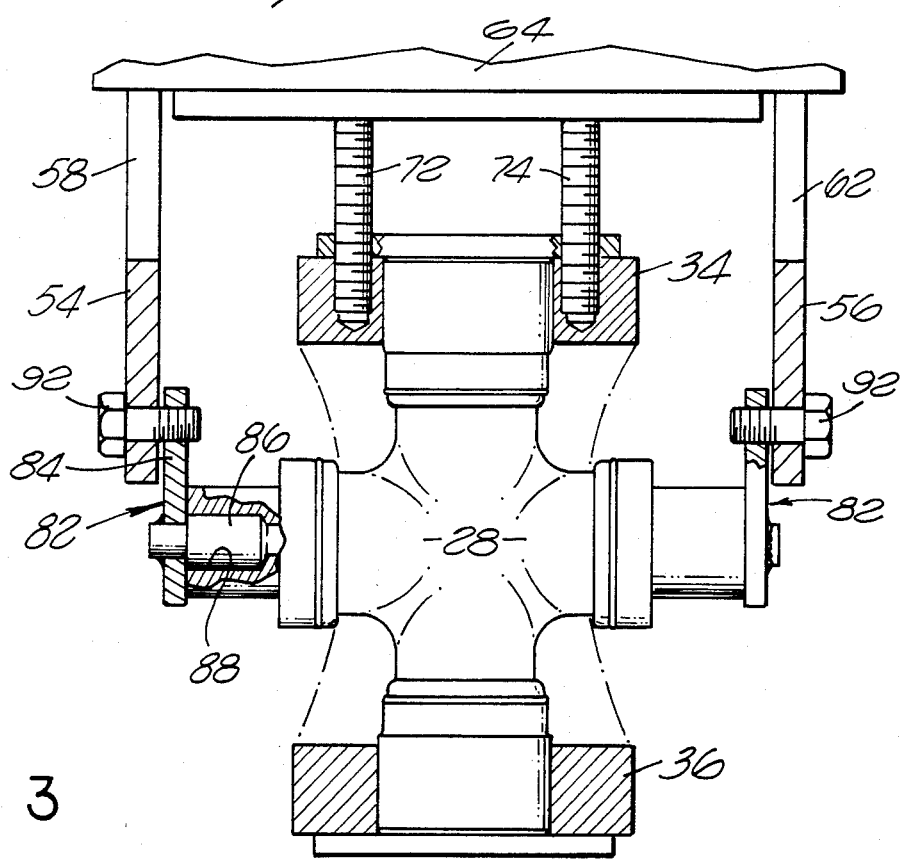
FIG. 3 is a sectional view, partially broken away, and similar to FIG. 2, illustrating a further embodiment of the tool.

Once the yoke 22 has been removed from the universal joint 14 it may be desirous to remove the yoke 32 from the universal joint as well in such cases where repair or replacement of the journal assembly 28 is required. Accordingly, referring to FIG. 3 with the bearing assemblies which were present when the horizontal arms 24 and 26 were secured to the universal joint 14 no longer present, adaptor members 82 are utilized to secure the tool 12 to the journal assembly 28. Accordingly, the adaptor member 82 is formed of a vertical arm 84 having a cylindrical slug 86 secured thereto. The cylindrical slug 86 is positioned in the opening 88 of the journal assembly which formed the lubricating vein for the bearing assembly. The arms 54 and 56 of the tool are secured to the vertical arm 84 of the adapter member 82 by means of a conventional bolt 92. Once the tool is in place as shown in FIG. 3, the procedure is again repeated so that the remaining bearing assemblies can be removed from the journal assembly 28.

It should be noted that the driven bar 64 can be positioned angles in the arm slots 58 and 62 so that when the interconnecting shafts 16 and 18 may be at an angle, the tool 12 can still be utilized to remove the bearing assembly from the journal assembly 28.

I claim:

1. Apparatus for disassembling a universal joint formed of a first and second yoke, each yoke having a pair of yoke arms, said yokes each being connected to a shaft, each of said yokes being secured to a journal assembly by means of cap screws threaded into openings in said yoke arms comprising:

a generally U-shaped member having a base and a pair of arms each extending at one end from said base along generally parallel axes in the same direction from opposite ends of said base;

means for securing the other ends of said U-shaped member arms to the arms of one of said pair of yokes, respectively, comprising a threaded bolt insertable in said openings of said yoke arms of said first yoke when said cap screw is removed from said yoke arm openings;

a drive bar secured to said U-shaped member arms and movable with respect to said U-shaped member arms;

a pair of drive studs threadably positioned in said openings formed in an arm of said second yoke when its securing cap screws are removed therefrom, said drive studs extending from said openings and being positioned adjacent said drive bar; and means for moving said drive bar and said drive studs simultaneously comprising a bolt positioned in said base and movable generally parallel to the axes of said U-shaped arms for enabling movement of one of said yokes with respect to the other of said yokes along an axis parallel to the axes of said U-shaped member arms.

2. Apparatus in accordance with claim 1 wherein said drive bar is movable in slots formed in said U-shaped member and at an adjustable angle with respect to the axes of said arms for enabling said drive bar to abut said drive studs when said shafts connected to said yokes extend at an angle with respect to each other.

* * * * *